Oct. 31, 1961     A. O. JANSSON     3,006,049
FASTENING DEVICE
Filed Oct. 28, 1958

Inventor:
Arnold O. Jansson,
by Walter P. Jones
Att'y.

United States Patent Office 3,006,049
Patented Oct. 31, 1961

3,006,049
FASTENING DEVICE
Arnold O. Jansson, Arlington, Mass., assignor to United-Carr Fastener Corporation, Cambridge, Mass., a corporation of Delaware
Filed Oct. 28, 1958, Ser. No. 770,112
1 Claim. (Cl. 24—73)

My invention aims to provide improved fastener secured assemblies and improved fastener members for the same.

An object of my invention is to construct a simplified fastener to provide a moisture tight assembly particularly in connection with motor vehicle body assemblies.

A further object of my invention is to provide a fastener that has a seal as an integral part of the stud member to reduce assembly costs and at the same time provide a better working seal.

Another object of my invention is to provide a fastener that has an improved sealing stud that may be used as a part of the fastener and the remainder of the fastener may be integral or it may be a piece assembled with the stud. In this manner the fastener may be either a single piece of molded plastic or the stud may be molded plastic and the remainder may be of metal.

In the drawings which illustrate preferred embodiments of my invention:

Figure 1:
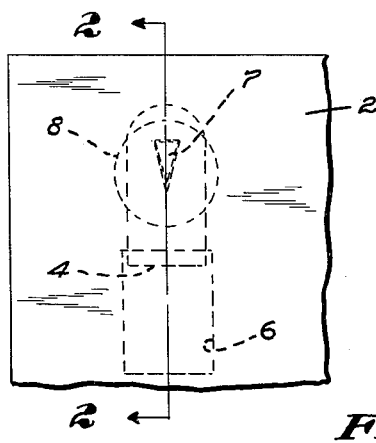
FIG. 1 is a plan view of a corner portion of an upholstery assembly.

My invention, as illustrated in the embodiment shown in FIGS. 1 through 6 inclusive, is directed to a so-called fastener secured upholstery assembly for automobiles and the like. The assembly illustrated includes a frame member 1, an upholstery panel 2, of any suitable construction, and a hook-on type of fastener.

Hook-on types of fasteners have been used for many years and usually have been of all metal construction. In more recent years, various types of sealing members have been combined with these metal fasteners to seal the assembly against the passage of moisture through an aperture 3 in the frame 1. The previous seals have been expensive because of extra assembly operations and extra cost.

I have provided an improved, simple, efficient and less expensive hook-on fastener comprising a metal hook member 4 for strength and a one piece yieldable stud 5 preferably formed of injection molded material. The hook member is hooked into engagemnet with the panel 2 through a hole 6 (FIG. 2) and is concealed within the panel. A prong 7 may or may not be provided to hold the fastener in place.

The yieldable stud 5 has a base portion 8, a continuous tapered wall 9 extending from the base and a relatively long guiding portion 10 beyond the wall 9. The stud 5 preferably has a bore 11, so that it may be hollow for at least a portion of its length, to aid in permitting flexing of the stud.

Figure 5:
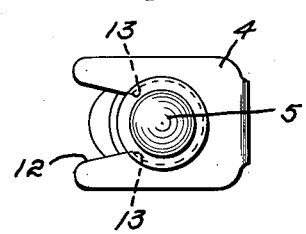
FIG. 5 is a bottom plan view of the fastener shown in FIG. 4.
Figure 6:
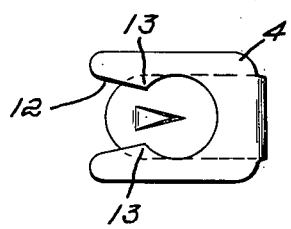
FIG. 6 is a bottom plan view similar to FIG. 5 with the stud removed.

Any means of assembling the stud to the hook may be employed but I have provided a simple means which includes a slot 12 in the hook member 4 (FIG. 6) with restricting projections 13—13 extending partly around the wall 9 and holding the stud in place as shown in FIG. 5. Thus engagement of the stud and hook may be accomplished by a simple lateral pushing of the parts together when positioned in proper relationship.

Figure 2:
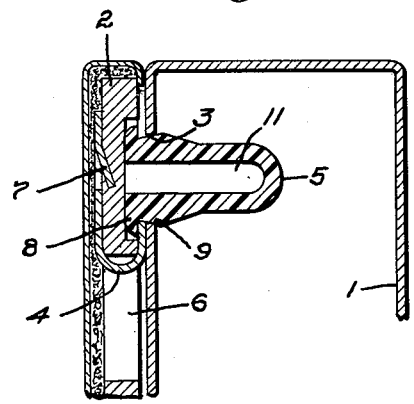
FIG. 2 is a section taken on the line 2—2 of FIG. 1.
Figure 3:
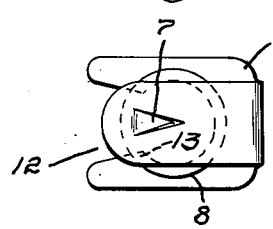
FIG. 3 is a top plan view of the fastener shown in FIG. 2.
Figure 4:
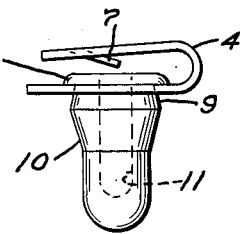
FIG. 4 is a side elevation of the fastener shown in FIG. 3.

When the assembly is completed, as shown in FIGS. 1 and 2, the stud passes into the aperture 3 in the frame 1 and the tapered wall 9 holds tightly in place filling the aperture 3 and excluded the passage of moisture from within the frame through the aperture 3. Thus, the upholstery is prevented from being moistened and stained.

Figure 7:
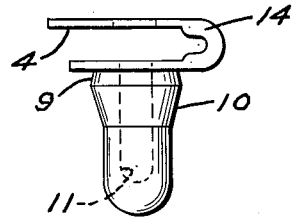
FIG. 7 is a side elevation of a one piece all plastic fastener member.
Figure 8:
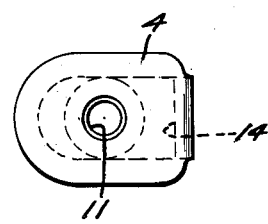
FIG. 8 is a top plan view of the fastener shown in FIG. 7.

In the embodiment of my invention shown in FIGS. 7 and 8, I have illustrated a one piece fastener formed of suitable molded plastic material. This construction is simplified by eliminating the necessity for assembly of two or more parts and the hook is stiffened by providing a reinforced connecting portion 14 at the bight of the hook.

Figure 9:
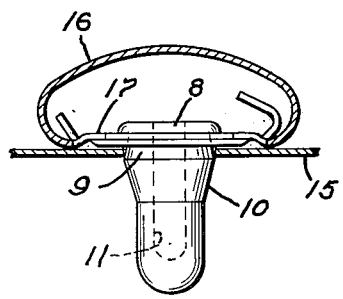
FIG. 9 is a partial section and partial elevation of a molding trim assembly showing a modified form of fastener with a plastic stud member and a metal molding engaging portion.

As a further disclosure of the utilities of my invention I have shown, in FIG. 9, a fastener in a so-called molding assembly. This assembly includes an apertured support 15, a trim molding 16, the same stud member 5 as in the device described in connection with FIGS. 1 through 6 inclusive, and a molding holding plate 17. The assembly of the stud 5 and plate 17 may be the same as in the hook-on fastener described above or a plain round hole may be used and the stud forced through that hole. Thus it will be understood that my simplified self-sealing stud construction may be used in many ways to provide the desired result of sealing an assembly when the stud shank passes through an aperture in a part of the assembly. The long guiding and entering portion is useful in making it easy to assemble the parts of an installation when the stud and stud receiving aperture are somewhat misaligned.

While I have illustrated and described preferred embodiments of my invention it should be understood that my invention is best described by the following claim.

I claim:

A fastener member for assemblies of the class described comprising a snap fastener member having a base portion, a support engaging snap fastener stud extending from said base portion, and a part engaging means assembled with said snap fastener member adjacent to said base portion for engaging a part to be held against a support, said stud being in the form of a yieldable snap fastener plug having a continuous wall for providing a seal against the passage of moisture when engaged in a stud receiving aperture in a support, the said snap fastener member being formed of molded plastic material and the part engaging means being formed of metal and having a slot for easy assembly with the stud, and restricting projections on said part engaging means extending into the slot to hold the parts in assembly.

(References on following page)

References Cited in the file of this patent

UNITED STATES PATENTS

| | | |
|---|---|---|
| 1,915,249 | Jorgensen | June 20, 1933 |
| 2,397,801 | Mitchell | Apr. 2, 1946 |
| 2,585,438 | Clingman | Feb. 12, 1952 |
| 2,851,078 | Mellon et al. | Sept. 9, 1958 |
| 2,862,267 | Parkin | Dec. 2, 1958 |
| 2,896,889 | Hershberger et al. | July 28, 1959 |
| 2,933,794 | Biesecker | Apr. 26, 1960 |

FOREIGN PATENTS

| | | |
|---|---|---|
| 364,492 | Great Britain | Jan. 7, 1932 |
| 745,788 | Great Britain | Feb. 29, 1956 |
| 845,808 | Germany | Aug. 4, 1952 |
| 1,051,695 | France | Sept. 16, 1953 |
| 1,111,742 | France | Nov. 2, 1955 |